derivatives such for instance as its dichlor its 4.4'—dimethyl derivative can be employed in carrying out my invention and I include all these compounds under the term a 2.2'—dimethyl—1.1'—dianthraquinonyl body. The coloring matters obtained from these derivatives possess the same general characteristics as those of the coloring matter obtained from the parent compound. As condensing agent I have found alcoholic potash to be very suitable, but other agents may be employed, such for instance as zinc chlorid.

UNITED STATES PATENT OFFICE.

ROLAND HEINRICH SCHOLL, OF KARLSRUHE, GERMANY, ASSIGNOR TO BADISCHE ANILIN & SODA FABRIK, OF LUDWIGSHAFEN-ON-THE-RHINE, GERMANY, A CORPORATION OF BADEN.

DYE OF THE ANTHRAQUINONE SERIES AND PROCESS OF MAKING SAME.

No. 856,811.　　Specification of Letters Patent.　　Patented June 11, 1907.

Application filed February 6, 1906. Serial No. 299,775.

*To all whom it may concern:*

Be it known that I, ROLAND HEINRICH SCHOLL, professor of chemistry and doctor of philosophy, a subject of the King of Prussia and Grand Duke of Baden, residing at Karlsruhe, in the Grand Duchy of Baden, German Empire, have invented new and useful Improvements in New Dyes of the Anthraquinone Series and Processes for Producing the Same, of which the following is a specification.

In the specification of United States Letters Patent No. 828,778, dated August 4, 1906, I have described the production of a new class of compounds of the anthraquinone series by heating a halogen anthraquinone with a metal, such as copper, which has the power of withdrawing halogen, and we have termed these new bodies dianthraquinonyl compounds. I have now discovered that 2.2'—dimethyl—1.1'—dianthraquinonyl on being heated either alone or with a condensing agent can be converted into coloring matter which upon reduction with an alkaline reducing agent yields a red vat which yes vegetable fiber red shades, which shades upon washing become from orange to yellow and are then extremely fast. Instead of 2.2'—dimethyl—1.1'—dianthraquinonyl itself, its derivatives such for instance as its dichlor its 4.4'—dimethyl derivative can be employed in carrying out my invention and I include all these compounds under the term a 2.2'—dimethyl—1.1'—dianthraquinonyl body. The coloring matters obtained from these derivatives possess the same general characteristics as those of the coloring matter obtained from the parent compound. As condensing agent I have found alcoholic potash to be very suitable, but other agents may be employed, such for instance as zinc chlorid.

The coloring matters which I desire to claim generically consist of from yellow to brown powders which are insoluble in water and in dilute acids and alkalies. They are soluble in concentrated sulfuric acid yielding blue solutions and are also soluble in hot nitro-benzene and in hot anilin. They are soluble in alkaline hydrosulfite yielding red solutions which yield on vegetable fiber red shades which shades on washing become from yellow to orange.

The coloring matter which I desire to claim specifically is that obtainable from 2.2'—dimethyl—1.1'—dianthraquinonyl itself. It is a brown powder and yields orange shades on vegetable fiber. I wish further to be understood as claiming these coloring matters both by themselves and also when fixed on the fiber. They can be stripped from the fiber by means of alkaline reducing agents and can then be made to show the afore mentioned characteristic reactions.

The following examples will serve to further illustrate the nature of my invention and the method of carrying it into practical effect, but the invention is not confined to these examples. The parts are by weight.

Example 1. Heat together for from one (1) to two (2) hours, in a reflux apparatus, one (1) part of 2.2'—dimethyl—1.1'—dianthraquinonyl with fifteen (15) parts of powdered potassium hydrate and five (5) parts of methyl alcohol in an oil-bath which is maintained at a temperature of from one hundred and sixty-five (165) to one hundred and seventy (170) degrees centigrade, and then treat the melt with water, in which it is soluble, forming a carmine red solution. Boil the solution and pass air through it until the brown color of the precipitate which forms no longer alters. Then make slightly acid, filter off, and wash.

Example 2. Introduce one (1) part of 2,2'—dimethyl—1.1'—dianthraquinonyl into a mixture of three (3) parts of caustic potash and two and three-fifths (2.6) parts of ethyl alcohol and heat, while stirring. Maintain the reaction mixture for from two (2) to three (3) hours at a temperature of from one hundred and forty (140) to one hundred and forty-five (145) degrees centigrade. Treat the melt with hot water and pass air through the boiling liquid until the color of the brown precipitate no longer changes. Then filter and wash with hot water. Instead of proceeding in this manner, the dianthraquinonyl compound can be boiled with thirty (30) times its weight of fifty (50) per cent. aqueous caustic potash, or it can be melted at a temperature of from two hundred and twenty (220) to two hundred and fifty (250) degrees centigrade with a mixture of from ten (10) to fifteen (15) parts of solid caustic potash and one (1) part of anhydrous sodium acetate. In all these cases the same coloring matter is obtained.

Example 3. Heat one (1) part of 2.2'—dimethyl—1.1'—dianthraquinonyl, while stirring well, at a temperature of from three hundred and fifty (350) to three hundred and eighty (380) degrees centigrade, taking care to avoid local over-heating. The melt which is at first greenish brown gradually assumes a red-brown color. After half an hour (30 minutes) allow the melt to cool and dissolve the mass obtained in from ten (10) to fifteen (15) parts of ninety-six (96) per cent. sulfuric acid. Precipitate by means of ice and water, filter and wash with water. The compound obtained is insoluble in water and in dilute acids and dilute alkalies. It dissolves in ninety-six (96) per cent. sulfuric acid yielding a blue solution, and in hot nitrobenzene and in hot anilin yielding yellowish brown solutions. It can be crystallized from nitrobenzene as a brown crystalline powder.

Example 4. Introduce one (1) part of 2.2'—dimethyl—1.1'—dianthraquinonyl into thirty (30) parts of molten zinc chlorid at a temperature of about two hundred and eighty (280) degrees centigrade, whereupon hydrochloric acid is evolved. A blood-red thick fluid melt is obtained, maintain this at the same temperature for about fifteen (15) minutes, and, after cooling, treat with warm water to which a little hydrochlorid acid has been added, filter and wash with hot water.

Example 5. Introduce four (4) parts of 4.4'—dichlor—2.2'—dimethyl—1.1'—dianthraquinonyl into a solution of thirty (30) parts of caustic potash in thirty-four (34) parts of alcohol, and boil the whole gently for from one and a half (1.5) to two (2) hours in an oil-bath at a temperature of from one hundred and fifty (150) to one hundred and sixty (160) degrees centigrade. Allow the melt to cool, treat it with hot water, boil, and pass air through the boiling solution until the brown color of the precipitate no longer changes. Acidify, filter and wash with hot water.

Example 6. Boil together, in a reflux apparatus, for three (3) hours, one (1) part of 2.2'—4.4'—tetramethyl—1.1'—dianthraquinonyl (prepared as described in Example 5 of the specification of United States Letters Patent No. 828,778, dated August 4, 1906,) and thirty (30) parts of a solution of caustic potash and alcohol, of such strength that it boils at a temperature of one hundred and thirty-five (135) degrees centigrade. Pour the reaction product into three hundred (300) parts of water and pass air through the boiling liquid until the liquid, which is at first red, becomes colorless and the reaction product has separated out in yellowish red flakes. Then filter and wash with hot water.

Now what I claim is:

1. The process for the production of anthraquinone coloring matter by heating a 2.2'—dimethyl—1.1'—dianthraquinonyl body.

2. The process for the production of anthraquinone coloring matter by heating a 2.2'—dimethyl—1.1'—dianthraquinonyl body with a condensing agent.

3. The process for the production of anthraquinone coloring matter by heating a 2.2'—dimethyl—1.1'—dianthraquinonyl body with alcoholic potash.

4. The process for the production of anthraquinone coloring matter by heating 2.2'—dimethyl—1.1'—dianthraquinonyl with alcoholic potash.

5. As new articles of manufacture the anthraquinone coloring matters which can be obtained by heating a 2.2'—dimethyl—1.1'—dianthraquinonyl body with a condensing agent, which coloring matters consist of from yellow to brown powders, which are insoluble in water and in dilute acids and in dilute alkalies, and are soluble in concentrated sulfuric acid yielding blue solutions and in hot nitrobenzene and in hot anilin, and which are also soluble in alkaline hydrosulfite yielding red vats, which yield red shades on vegetable fiber, which shades on washing become from yellow to orange.

6. As a new article of manufacture the coloring matter which can be obtained from 2.2'—dimethyl—1.1'—dianthraquinonyl, which coloring matter is a brown powder which is insoluble in water and in dilute acids and in dilute alkalies, and is soluble in concentrated sulfuric acid yielding a blue solution and in hot nitrobenzene, and is soluble in alkaline hydrosulfite yielding a red vat which yields red shades on vegetable fiber, which shades on washing become orange.

In testimony whereof I have hereunto set my hand in the presence of two subscribing witnesses.

ROLAND HEINRICH SCHOLL.

Witnesses:
  J. ALEC. LLOYD,
  JOS. H. LEUTE.